Jan. 19, 1954 E. KRAH ET AL 2,666,838
THERMOSTATICALLY CONTROLLED ELECTRIC WATER HEATER
Filed July 29, 1953 5 Sheets-Sheet 1
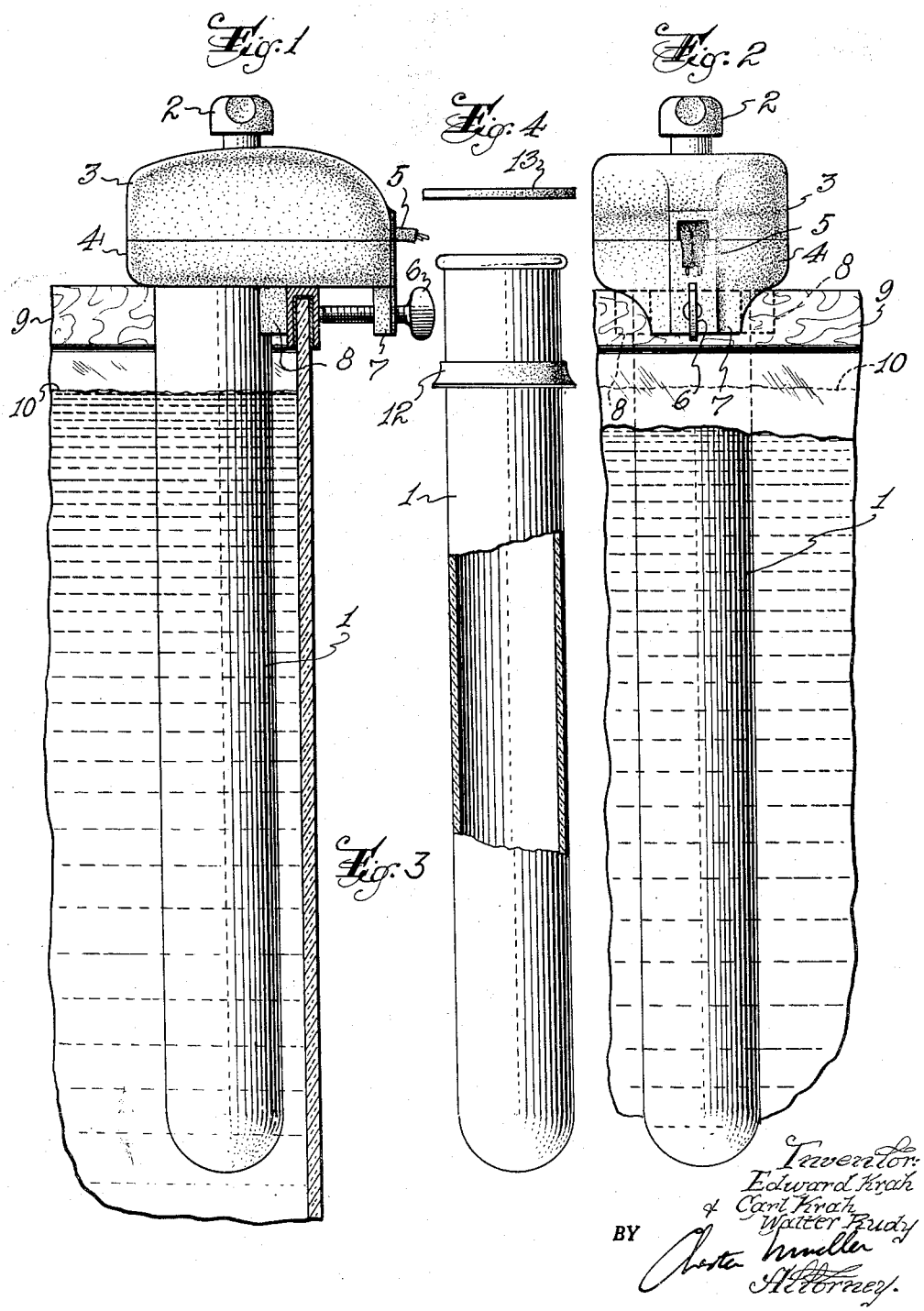

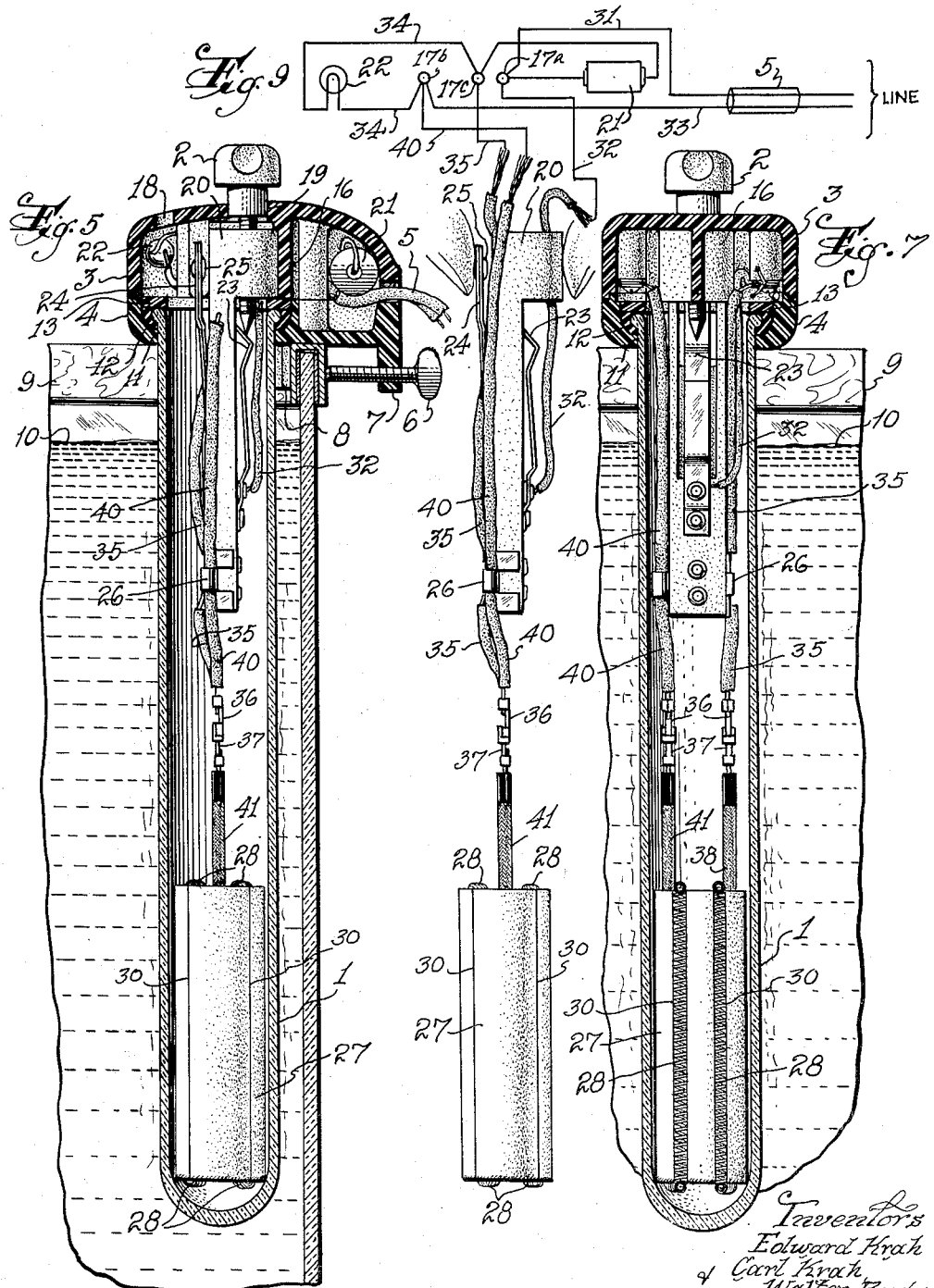

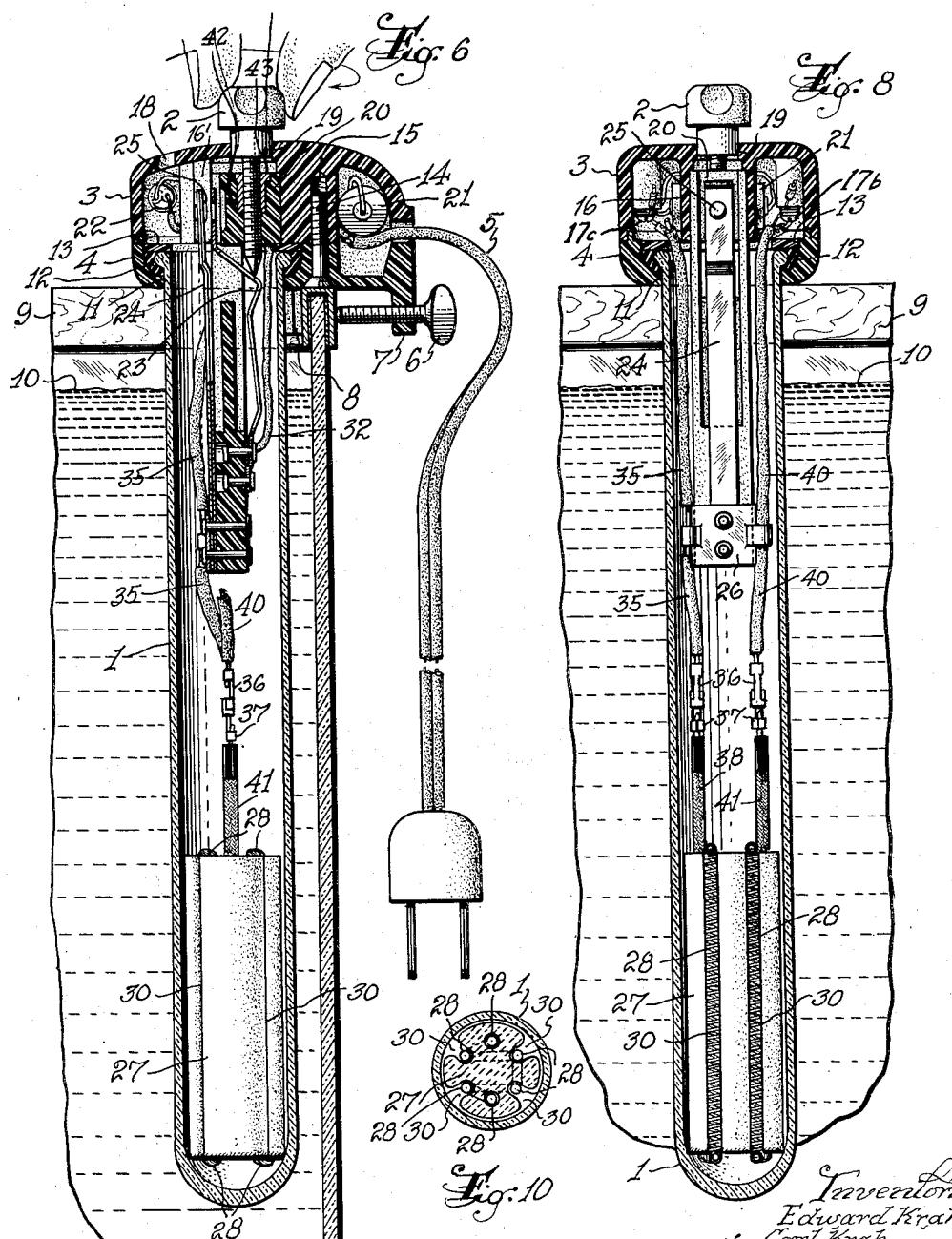

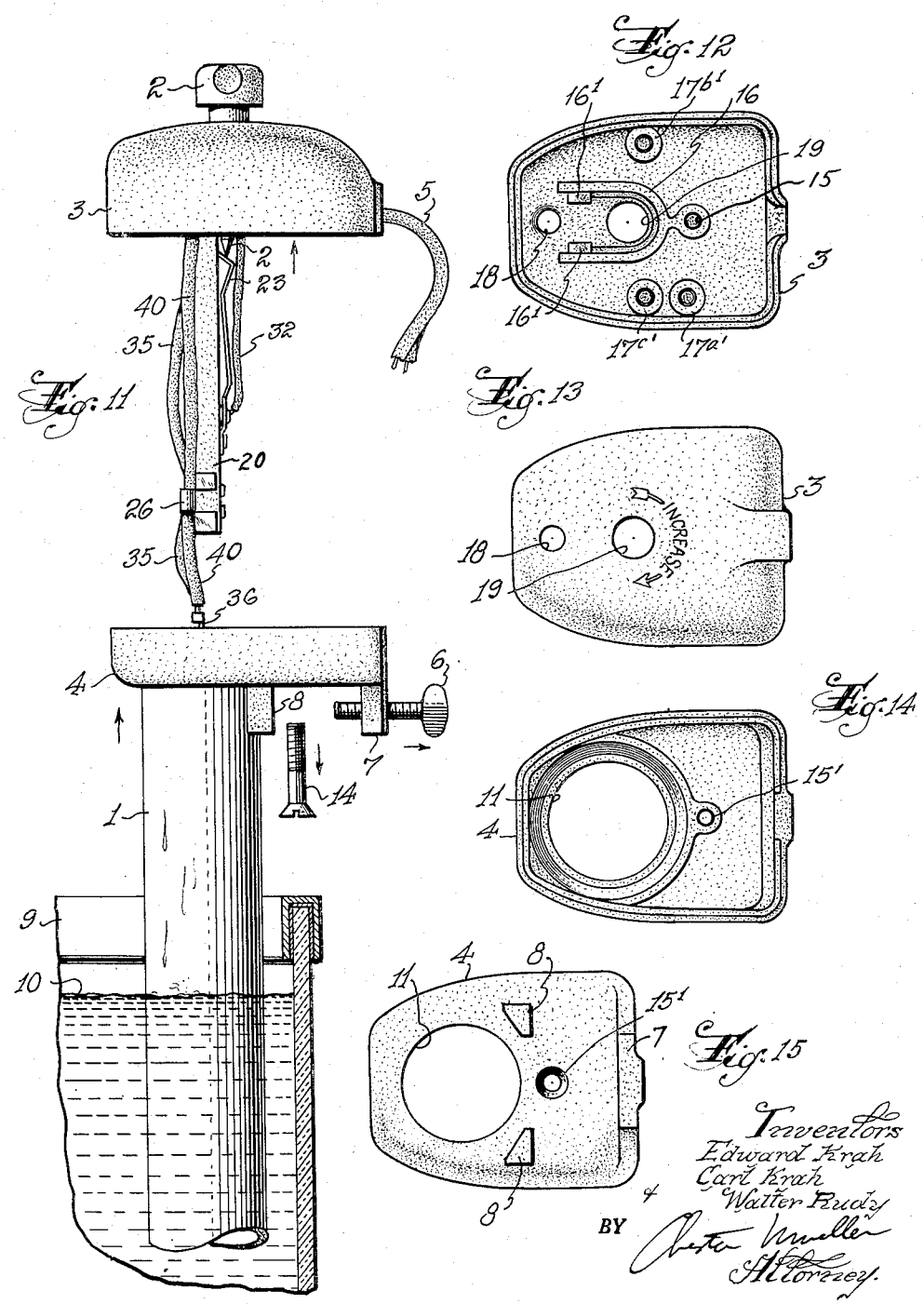

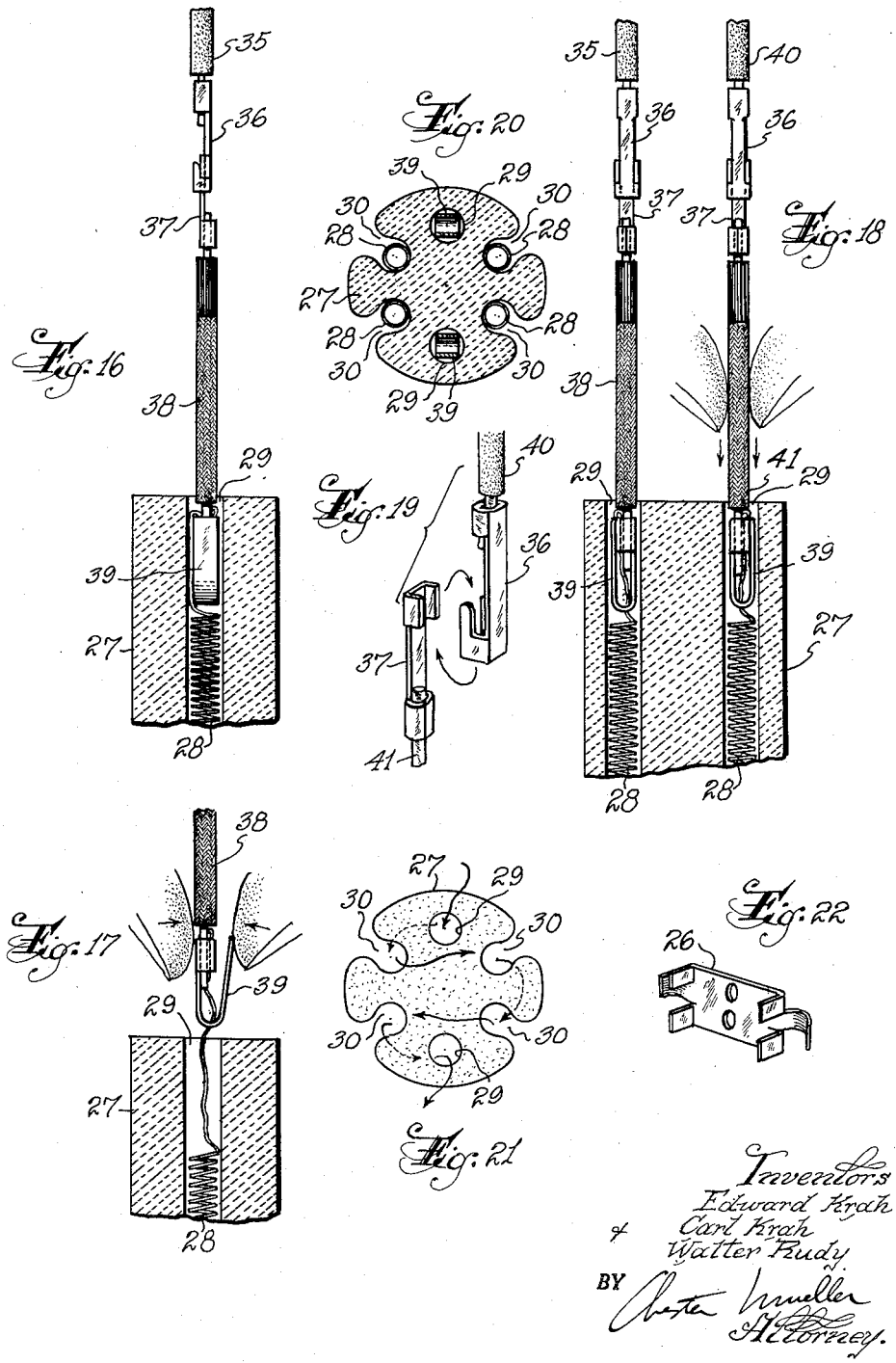

Patented Jan. 13, 1954

2,666,838

UNITED STATES PATENT OFFICE 2,666,838

THERMOSTATICALLY CONTROLLED ELECTRIC WATER HEATER

Edward Krah, Carl Krah, and Walter Rudy, Newark, N. J., assignors to Pyramid Aquariums, Inc., Newark, N. J., a corporation of New Jersey Application July 29, 1953, Serial No. 370,993

5 Claims. (Cl. 219—41)

This invention relates to a thermostatically controlled electric water heater capable of giving off heat when the ambient temperature is below a pre-determined level.

It is the object of this invention to provide a small portable electric water heater for safe use in aquariums, or the like, to maintain the liquid contained therein at a constant temperature. A further object is to provide a heater that is easy to attach to the side of an aquarium or similar vessel and one in which the heating element is adequately protected from the liquid when the heater is partially immersed.

A still further object is to provide in such a heater visual means for indicating whether or not current is passing through the heating element and means for adjusting to the temperature at which the heater will function.

The invention is also intended to permit a compact, durable heater to be readily assembled of easily and economically fabricated parts which incorporate a number of self-fastening features. A further object is to enable such a heater to be readily disassembled for examination or replacement of parts.

Further objects will be apparent from the description which follows.

This invention is illustrated in the accompanying drawings in which:

Figure 1 is a side elevation of the heater mounted in operating position on the wall of an aquarium;

Figure 2 is the corresponding front elevation;

Figure 3 is an elevational view of the tube portion of the heater, partly in section, with encircling sealing washer;

Figure 4 is a side view of the ring against which the mouth of the tube bears when assembled in the heater;

Figure 5 is the view of Figure 1, partly in section;

Figure 6 is the view of Figure 5 further sectionalized and illustrating the use of the thermostat adjustment screw;

Figure 7 is the view of Figure 2, i. e., front elevation, partly in section;

Figure 8 is similar to Figure 7, being a rear elevation, partly in section;

Figure 9 is a side elevation of the heating element, removed from the tube, with wiring and wiring diagram;

Figure 10 is a section through the lower portion of the tube and its contained heating element;

Figure 11 is a side elevational view of a partially assembled heater;

Figure 12 is a bottom view of the cap piece;

Figure 13 is a top view of the cap piece;

Figure 14 is a top view of the tube holder;

Figure 15 is a bottom view of the tube holder.

Figure 16 is an enlarged fragmentary side view, partly in section, of the heating element lead wire connections;

Figure 17 illustrates the manner in which the resistor wire connection to a lead wire appears prior to insertion in the heating element;

Figure 18 is a front view of the illustration of Figure 16 and shows the final positioning of one of the resistor wire connectors;

Figure 19 is an enlarged perspective of the two parts of the snap-on connection for the heater element lead wires;

Figure 20 is an enlarged section of the heating element;

Figure 21 is an enlarged top view of the mounting for the heating element showing the direction of the winding of the resistor wire upon and through it;

Figure 22 is an enlarged perspective view of the separator for the heating element lead wires.

Referring to the figures in which the same identification number refers to the same or similar part, a single embodiment of this invention is illustrated. Figures 1 and 2 best illustrate the outward appearance of the completely assembled heater. The heater is there shown secured to marginal edge 9 of an aquarium in position ready for use. Immersed in water below water level 10 is heat resistant glass tube 1 rigidly suspended from recessed opening 11 in the tube holder 4, the latter being surmounted by cap 3.

Cap 3 and tube holder 4 are rigid, non-electrical conducting members formed of molded plastic with matching edges. They are shown separately, in detail, in Figures 12 through 15. Projecting upward through an opening 19 in cap 3 is thermostatic adjusting screw 2. Leading outward from another opening in cap 3 is two-wire cord 5 which is connectible to an electric power supply line.

Outside clamp member 7, inside clamp members 8, and thumb screw 6 cooperate to fasten the heater on marginal edge 9 of the aquarium.

Figure 3 illustrates tube 1 with rubber sealing washer 12 and rigid plastic ring 13 which in the assembled heater bear respectively against the inner and outer surface of the lip which surrounds the opening of tube 1. It should be here noted that when tube 1 is inserted in recessed opening 11 of tube holder 4, rubber sealing washer 12 will be pressed against the lip surrounding the opening of tube 1 and will flare upward against it rather than downward as shown in Figure 3. Sealing washer 12 and the close fit of the several parts exposed to water splash prevent entrance of water into the heater.

Mounted within, and projecting into tube 1 from cap 3 are the electrical wires, parts and connections best shown in their unitary relationship in Figures 9 and 11.

Fitted into cap 3 are capacitor 21 and lamp 22, lamp 22 being beneath opening 18 in cap, thus permitting the lamp to be viewed from the outside. Threaded openings 17a', 17b', and 17c' are provided in cap 3 as shown in Figure 12 to accommodate binding posts 17a, 17b, and 17c. Fitted within tube retainer and switch mounting recess 16 is the top of porcelain switch mounting 20 which is contoured to the U shaped outline of recess 16 and prevented from lateral movement by lugs 16'. Thermostatic adjusting screw 2 passes through threaded collar 43 in opening 42 in such top of switch mounting 20, the end of adjusting screw 2 bearing upon adjustable switch arm 23.

Projecting downward from its seat in recess 16 of cap 3 is switch mounting 20 upon which are mounted, on opposite faces thereof, adjustable switch arm 23 and bi-metal switch arm 24. The former is mounted directly thereon; the latter by means of separator 26 by which it is anchored. Separator 26 shown separately in Figure 22 clamps onto the switch mounting 20 and has curved extending ends clasping wires 35 and 40 passed through them. At the free end of bi-metal switch arm 24 is contact button 25.

Rigid wires 35 and 40, connectors 36 and 37 and wires 38 and 41, physically secure heating element 27 a spaced distance below switch mounting 20, facilitating final assembly of the heater.

Cap 3 with its contained and projecting parts is secured to tube holder 4 by screw 14 which passes through hole 15' in tube holder 4 and screws into threaded opening 15 in cap 3.

Referring now to Figure 9, the path of an electric current may be traced from wire 31 of cord 5, to binding post 17a, wire 32, to and through adjustable switch arm 23, contact button 25, bi-metal switch arm 24, separator 26, wire 35, connectors 36 and 37, connector 39, resistor wire 28, connector 39, wire 41, connectors 36 and 37, wire 40, binding post 17b, and wire 34 of cord 5. When the switch arms are closed, lamp 22 will be energized through wire 35, binding posts 17c and wires 34 and 33.

Capacitor 21 is connected across binding posts 17a and 17c.

The details of several electrical connections are best shown in Figures 16 through 22. It should be noted that the snap-on fasteners 36 and 37 are connected by overlaying one upon the other and then drawing them together. Connector 39 is a strip of metal bent partially upon itself, and when inserted in hole 29, as shown in Figure 17, will be friction fitted to the heating element 27. This element shown in Figures 20 and 21 is of insulating material having two longitudinal holes 29 and four longitudinal grooves 30. Resistor wire 28 is threaded through the holes and grooves in the pattern illustrated in Figure 21, each end being joined with the proper lead wire by clamping within the closed end of connector 39.

The heater may be assembled by connecting the various wires and electrical parts to mounting 20 which is then seated in cap 3 with the parts related as shown in Figure 11. Cap 3 is then closed on tube holder 4 and secured by screw 14. Ring 13 will bear on tube 1 and hold it firmly in rigid relationship with tube holder 4. The heater may then be clamped to marginal edge 9 of the aquarium by thumb screw 6 ready for use.

Figures 5, 6, 7 and 8 show the relationship of the various parts in the completely assembled heater.

Use of fasteners 36 and 37 not only facilitates assembly, but permits the top portion of the heater to be used with heating elements and glass tubes of various sizes. For example, with a deeper aquarium a longer glass tube of the same diameter would be substituted for the one shown in the drawings. Likewise, a more powerful heating element would be employed. By removing screw 14, cap 3 may be lifted upward and the contents of glass tube 1 withdrawn. Fasteners 36 and 37 may then be detached and heating element 27 removed. A new heating element, with rigid wires of longer length projecting upward therefrom and terminating in fasteners 37 may then be secured by fasteners 36 and 37. A longer tube may then be substituted for glass tube 1 in tube holder 4, and then cap 3, with its newly suspended heating element replaced over tube holder 4.

The operation of the heater requires that electric cord 5 be plugged in to an appropriate electrical outlet, and by use of adjusting screw 2, contact made between adjustable switch arm 23 and bi-metal switch arm 24. This will cause current to flow through the circuit, lighting lamp 22 and energizing resistor wire 28. When the heat of the liquid in the tank reaches the desired temperature, which is determined by use of a thermometer, not shown in the drawings, and not a part of this invention, adjusting screw 2, is rotated to break contact, leaving a small air gap between contact button 25 and adjustable switch arm 23. Thereafter, a drop in the temperature of the water will cause bi-metal switch arm 24 to move sufficiently to close contact button 25 on adjustable switch arm 23 and again energize resistor wire 28.

The sensitivity of the heater will depend upon the bi-metal switch arm and many acceptable kinds are commercially available.

Various materials, other than those described and illustrated, may be used and a number of modifications made in the construction of the heater without departing from the scope of this invention. We do not therefore, by the form herein illustrated, limit ourselves in such scope.

What we claim is:

1. A thermostatically controlled electric immersion heater comprising a shallow receptacle adapted to be removably secured to the side of an aquarium at right angle thereto; a tube open at one end, suspended by its open end through a hole in the bottom of the receptacle; a concave cover for the receptacle; a capacitor and a lamp in the cover with the lamp opposite an opening in the cover; an elongated switch mounting friction fitted at its upper end within a boss on the inside of the cover and projecting downward within the tube; a flat ring interposed between the periphery of the open end of the tube and the end of the said boss; a sealing washer surrounding the tube where it passes through the receptacle; a temperature responsive switch mounted on the switch mounting; a finger piece rotatable in the upper end of the switch mounting and projecting outward through the cover and adapted to adjust the spacing between the contact points of the temperature responsive switch; an electric resistance heater; means for removably securing the electric resistance heater in rigid suspension from the switch mounting; and an electrical circuit including the electric resistance heater, switch, lamp, and capacitor.

2. A thermostatically controlled electric immersion heater comprising a shallow receptacle adapted to be removably secured to the side of an aquarium at right angle thereto; a tube open at one end, suspended by its open end through a hole in the bottom of the receptacle; a concave cover for the receptacle; a capacitor and a lamp in the cover with the lamp opposite an opening in the cover; an elongated switch mounting friction fitted at its upper end within a boss on the inside of the cover and projecting downward within the tube; a flat ring interposed between the periphery of the open end of the tube and the end of the said boss; a sealing washer surrounding the tube where it passes through the receptacle; a temperature responsive switch mounted on the switch mounting; a finger piece rotatable in the upper end of the switch mounting and projecting outward through the cover and adapted to adjust the spacing between the contact points of the temperature responsive switch; an electric resistance heater with a pair of rigid lead wires projecting upward therefrom; an electrical circuit including the electric resistance heater, switch, lamp and capacitor; a pair of rigid wires, included in the electrical circuit secured to the switch mounting and projecting downward therefrom; and a connection between each of the rigid upward projecting lead wires with a rigid downward projecting wire comprising a pair of formed flat metal strips, each strip being clamped at one end about the end of a wire and joined at the other end in detachable locking relationship with the other.

3. A thermostatically controlled electric immersion heater comprising a shallow receptacle adapted to be removably secured to the side of an aquarium at right angle thereto; a tube open at one end, suspended by its open end through a hole in the bottom of the receptacle; a concave cover for the receptacle; a capacitor and a lamp in the cover with the lamp opposite an opening in the cover; an elongated switch mounting friction fitted at its upper end within a boss on the inside of the cover and projecting downward within the tube; a flat ring interposed between the periphery of the open end of the tube and the end of the said boss; a sealing washer surrounding the tube where it passes through the receptacle; a temperature responsive switch mounted on the switch mounting; a finger piece rotatable in the upper end of the switch mounting and projecting outward through the cover and adapted to adjust the spacing between the contact points of the temperature responsive switch; an elongated electric resistance heater containing two holes in its top surface; a pair of rigid lead wires connected to the terminals of the heater resistance wire, each wire being also connected to a resilient strip partially bent back upon itself with its bent portion inserted in one of the said holes in the top surface of the heater in friction fit engagement therewith; an electrical circuit including the electric resistance heater, switch, lamp and capacitor; a pair of rigid wires, included in the electrical circuit, secured to the switch mounting and projecting downward therefrom; and a connection between each of the rigid lead wires and a rigid downward projecting wire comprising a pair of formed flat metal strips, each strip being clamped at one end about the end of a wire and joined at the other end in detachable locking relationship with the other.

4. In an electric immersion heater of the character described, a plurality of wire connectors for detachably suspending an electric resistance heating element by its lead wires from depending power supply lines, each connector comprising a pair of electrical conducting metal strips, the far end of each being adapted to be fixed to a wire; the near end of one strip having its edges turned up to form a channel therewith; the near end of the other strip having a similar channel with a slot in the inward edge of each wall at the base thereof adapted to receive in detachable engagement the bottom of the oppositely turned channel of the first strip.

5. In an electric immersion heater of the character described, a plurality of wire connectors for detachably suspending an electric resistance heating element by its lead wires from depending power supply lines, each connector comprising a pair of electrical conducting metal strips, the far end of each being adapted to be fixed to a wire; one strip having for a short distance from its near end upstanding walls on its edges forming a channel of width sufficient to accommodate the width of the second strip; the second strip having a similar channel at its near end of width sufficient to accommodate the width of the first strip and with the inward edges of the walls at their bases slotted to receive in friction fit engagement a portion of the bottom of the inverted channel of the first strip.

EDWARD KRAH.
CARL KRAH.
WALTER RUDY.

References Cited in the file of this patent

UNITED STATES PATENTS

| Number | Name | Date |
|---|---|---|
| 1,209,862 | Lidberg | Dec. 26, 1916 |
| 1,662,555 | Wojciechowski | Mar. 13, 1928 |
| 1,670,437 | Campbell | May 22, 1928 |
| 1,837,000 | Wertz | Dec. 15, 1931 |
| 1,855,018 | Glessner | Apr. 19, 1932 |
| 2,201,703 | Sage | May 21, 1940 |
| 2,477,363 | Danner | July 26, 1949 |
| 2,576,688 | Landgraf | Nov. 27, 1951 |